United States Patent [19]
Ackerman et al.

[11] Patent Number: 5,467,474
[45] Date of Patent: Nov. 14, 1995

[54] DISPLAY SYSTEM WITH SECTION ADDRESSABILITY

[75] Inventors: Marvin Ackerman, Sunnyvale, Calif.; Vincent Berluti, Southbury, Conn.; Terrell Poland; Steven Waldron, both of Danbury, Conn.

[73] Assignee: Electronic Retailing Systems International, Inc., Wilton, Conn.

[21] Appl. No.: 210,163

[22] Filed: Mar. 17, 1994

Related U.S. Application Data

[62] Division of Ser. No. 757,675, Sep. 10, 1991.

[51] Int. Cl.[6] .......................... G06F 3/147; G06F 17/60; G08B 5/22; G09F 21/04
[52] U.S. Cl. .................. 395/800; 340/825.35; 364/403; 364/404; 364/401
[58] Field of Search .................................. 365/325, 800, 365/575, 200; 364/401, 402, 403, 404; 235/383, 385; 340/825.38, 825.55; 380/825.38, 825.55

[56] References Cited

U.S. PATENT DOCUMENTS

| | | |
|---|---|---|
| 3,359,541 | 12/1967 | Hunkins et al. . |
| 3,691,528 | 8/1972 | Galugama et al. ................... 340/172.5 |
| 3,715,725 | 2/1973 | Kievit et al. ............................ 340/147 |
| 3,899,775 | 8/1975 | Larsen .................................... 340/147 |
| 3,979,723 | 9/1976 | Hughes et al. ......................... 340/147 |
| 4,002,886 | 1/1977 | Sundelin ............................... 340/172.5 |
| 4,139,149 | 2/1979 | Crepeau et al. ......................... 235/383 |
| 4,346,453 | 8/1982 | Drapeau et al. ......................... 395/800 |
| 4,500,880 | 2/1985 | Gomersall et al. ................. 340/825.35 |
| 4,521,677 | 6/1985 | Sarwin ................................... 235/385 |
| 4,603,495 | 8/1986 | Stevens .................................... 40/451 |
| 4,766,295 | 8/1986 | Davis et al. ............................ 235/383 |
| 4,783,740 | 11/1988 | Ishizawa et al. ........................ 364/903 |
| 4,821,291 | 4/1989 | Stevens et al. .......................... 375/37 |
| 4,888,709 | 12/1989 | Revesz et al. .......................... 395/114 |
| 4,962,466 | 10/1990 | Revesz et al. .......................... 364/518 |
| 5,019,811 | 5/1991 | Olsson et al. ...................... 340/825.17 |
| 5,111,196 | 5/1992 | Hunt .................................. 340/825.38 |
| 5,172,314 | 12/1992 | Poland et al. .......................... 364/401 |
| 5,198,644 | 3/1993 | Pfieffer et al. .......................... 235/383 |
| 5,241,467 | 8/1993 | Failing et al. .......................... 304/404 |
| 5,241,657 | 8/1993 | Fine ........................................ 395/162 |
| 5,245,534 | 9/1993 | Waterhouse et al. ................... 235/404 |

FOREIGN PATENT DOCUMENTS

| | | |
|---|---|---|
| 299355 | 1/1989 | European Pat. Off. . |
| 0396414 | 3/1990 | European Pat. Off. . |
| 9305475 | 3/1993 | WIPO . |
| 9305456 | 3/1993 | WIPO . |

OTHER PUBLICATIONS

"Microcomputer and Microprocessors: The 8080, 8085, and Z-80 Programming, Interfacing, and Troubleshooting", 1985 (Uffenbeck) pp. 153–155.

"Automated Labeling System", IBM Technical Disclosure Bulletin vol. 34, No. 1, pp. 453–458, Jun. 1991.

*Primary Examiner*—Alyssa H. Bowler
*Assistant Examiner*—L. Danaghue
*Attorney, Agent, or Firm*—Oppedahl & Larson

[57] ABSTRACT

In a system for displaying prices in a retail store, improved system architecture and stored programs are disclosed to permit improved accuracy in confirming the physical location of display devices called labels. A response from a label to the host, or central computer, has appended to it an additional message by an appender, one of a plurality of appenders located throughout the architecture. The appender's message permits localization of the labels. A power-on status flag in a response from the labels permits the central computer to determine, through global inquiries to all the labels, whether any of the labels has had an interruption of power. A dongle or RF-linked bar-code scanner permits store personnel to send messages to the central computer to request that labels in a particular subarea of the store display alternative information such as the amount of inventory for items in that subarea.

15 Claims, 7 Drawing Sheets

DISPLAY SYSTEM WITH SECTION ADDRESSABILITY

This application is a division of application Ser. No. 07/757,675, filed on Sep. 10, 1991.

The present invention relates to computer systems and particularly to electronic price display systems in which a large number of remote electronic price display tags communicate with and are controlled by a central computer.

BACKGROUND OF THE INVENTION

Much attention has been given in recent years to systems used in retail stores for displaying the prices of goods. While manual marking of the prices at the location of the goods, or on the goods themselves, is conventional, attempts have been made to use electronic means instead for displaying the prices at the goods location.

In an experimental stage, some electronic pricing systems employ price tags, also sometimes called modules or labels, each having a display which is typically of a liquid crystal type. One or more data buses are used in such systems to connect many thousands of the labels to a central computer allowing the latter to communicate with particular ones of the labels, e.g. to direct changes in their displayed prices. To this end, the labels are equipped with connectors so that they can be snapped onto one of many locations along rails running along the edges of the store shelves. The connectors electrically connect the labels to buses running along the rails to the central computer.

Experience has shown that physical placement of products within a store has, oftentimes, enormous influence on the sales of the products. Factors including shelf height for a product, and the number of product facings along a shelf can be of great significance to store planners. Thus, it is important for a store planner to ensure that the "plan-o-gram" of the store, which is a plan showing product locations on shelves, is faithfully followed. However, deviations from the plan-o-gram could often result from accidental or intentional misplacement of the labels by store personnel, by customers, or by others.

Attempts have been made to detect misplacement of electronic price display labels so as to remedy it effectively. One such prior art attempt involves the use of an individual electronic controller serving each rail. Nevertheless, such an expedient can, at best, detect misplacement only if a tag has strayed so far as to be on a rail served by another controller. Besides requiring a large number of controllers in a given installation and being ineffective to detect misplacement to a different location on the rail served by a given controller, such systems require that individual labels perform many of the communication transactions, requiring more complex, and thus costly, electronic components.

Accordingly, it is desirable to have an electronic price display system in which detection of a misplacement of a label and communication with the central computer can be carried out effectively and expeditiously.

Those familiar with modern supermarket operations will also appreciate that from time to time it is desirable that store personnel have information other than price regarding store items, quickly and conveniently available. That is, it would be desirable if store personnel could controllably cause a label, or a group of labels in a section, or "subarea" of the store, to show some data other than price regarding each item of merchandise. For example, though product scanning at the checkout counter permits most store items to be reordered automatically, it is nonetheless helpful for personnel to be able to walk the aisles of the store to identify visually any items that require reordering or restocking from the back room of the store. Shoplifting and other forms of inventory shrinkage, for example, can give rise to a disparity between the expected stock (defined as the difference between the amount of product shipped to the store and the amount of product sold at the checkout counter) and actual stock physically present in the store. It would be desirable to have a means whereby the labels would display in numerical terms the number of cases of the product that are in the back room. Where the shelf is bare and the back-room case count is small or zero, personnel can initiate an exceptional reordering of product. Where the displayed back-room case count is at odds with the actual case count in the back room, other corrective action may be taken. It is further desirable that the shift to an alternative display of information be confined to particular subareas, so that the in the remainder of the store the price information usually available to customers continues to be visible.

SUMMARY OF THE INVENTION

In accordance with the invention, a system is provided offering the above-mentioned desirable capabilities not found in the prior art. A central computer controls the system generally, sending and receiving messages with labels that display prices. Appenders are provided, which permit quite specific physical localization of labels. A response from a label to the host, or central computer, has appended to it an additional message by at least one appender, one of a plurality of appenders located throughout the architecture. The appender's message, which contains information uniquely identifying the appender, permits localization of the labels. Each label further has a power-on status flag, set at such time as the label is powered up. This flag bit in the labels permits the central computer to determine, through global inquiries to all the labels, whether any of the labels has had an interruption of power. Also provided is a dongle or RF-linked bar-code scanner which permits store personnel to send messages to the central computer to request that labels in a particular subarea of the store display alternative information such as the amount of inventory for items in that subarea.

The system of the invention permits much more effective localization of labels than heretofore possible, allows selective changing of displays of fewer than all labels to an alternative display, and facilitates location of errant labels.

DESCRIPTION OF THE DRAWINGS

An exemplary embodiment of the invention will be described with respect to drawings, of which:

FIG. 4b is a cross section of a shelf rail 9 of FIG. 4a;

Like items in the figures have been indicated, where possible, with like reference designations.

DETAILED DESCRIPTION OF THE EMBODIMENT

Figure 1:
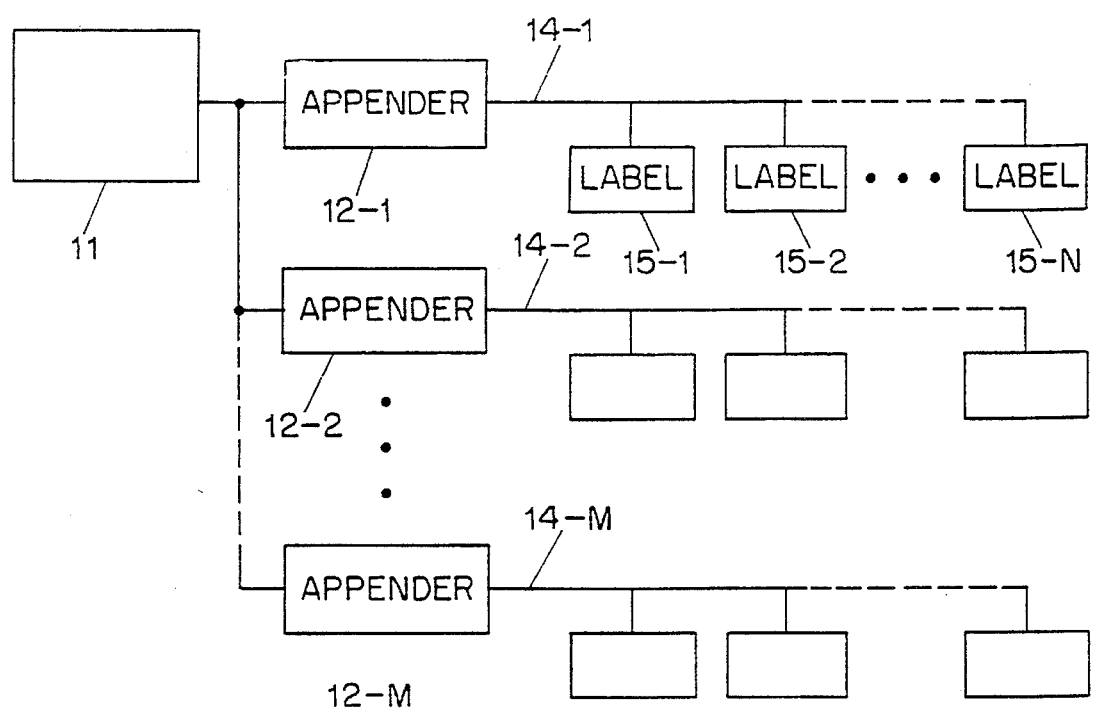
FIG. 1 is a block diagram of a system according to the invention with central computer 11, appenders 12 and labels 15.

FIG. 1 illustrates an electronic pricing system 10 embodying the principles of the present invention. System 10 may be employed in a retail store where goods for sale are placed on shelves. In FIG. 1, computer 11, which may be a conventional microcomputer with appropriate bus interface circuitry, is electrically connected to buses 14-1, 14-2 . . . and 14-M in a multi-drop arrangement. Each of these buses runs along the rail of a store shelf in the retail store. As shown in FIG. 1, a multitude of labels are electrically connected to the buses. Illustratively, labels 15-1, 15-2, . . . and 15-N are electrically connected to bus 14-1 in a manner to be described. In this arrangement, computer 11 can communicate with the labels through their respective buses. In addition, an appender is electrically connected to each of the buses between computer 11 and the labels of that bus. Bus 50 provides a bidirectional communication path between computer 11, also sometimes called a host, and appenders 12. Illustratively, appenders 12-1, 12-2 . . . , and 12-M are electrically connected in such a manner to buses 14-1, 14-2, . . . and 14-M, respectively. All of these appenders are structurally identical to one another, differing only in their respective bus addresses as described further below. It should be noted at this point that M and N are integers whose values are determined by a store planner. The actual values selected are, of course, dependent upon the particular arrangement of the shelves in the retail store. In one embodiment there is an appender for each four-foot section of shelf rail in the store. Depending on the context, the bus 50 and the buses 14-1, 14-2, etc. will be collectively called the bus; in some contexts the buses 14-1, 14-2 etc. will instead be termed bus extensions to the bus 50.

Figure 2:
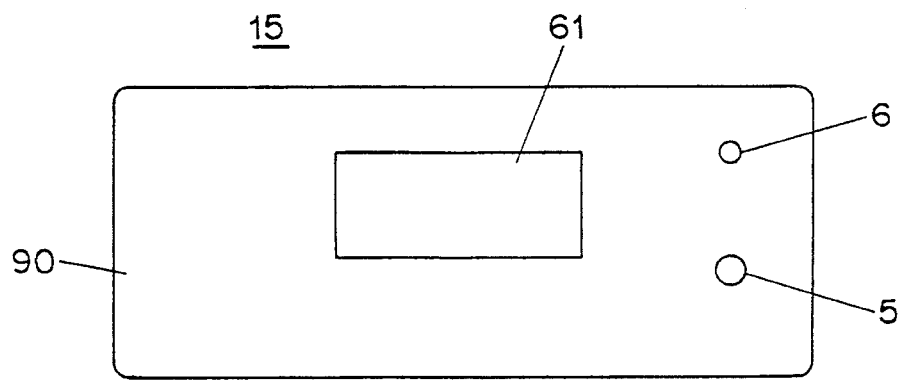
FIG. 2 is a front view of a label 15.
Figure 3:
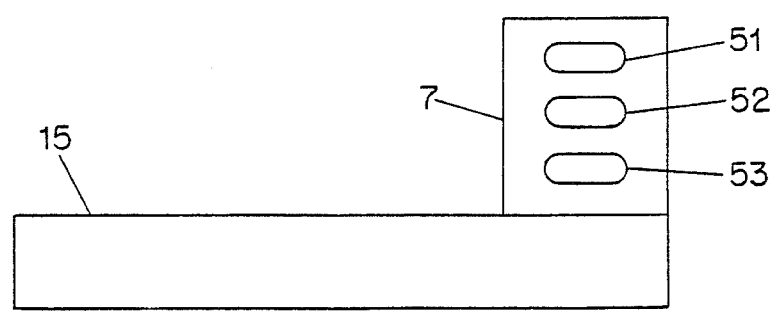
FIG. 3 is a top view of a label 15.

All of the labels are structurally identical to one another, differing only in their respective bus addresses as described further below. FIG. 2 provides the front view of one such label. It comprises display 61 which is, for example, of liquid crystal type, light emitting diode (LED) 6 which is controllable by the label, and push-button 5 whose function is described hereinbelow. A case 90 provides mechanical interconnection of the various parts of the label 15. FIG. 3 provides the top view of the label. As shown in FIG. 3, the label has connector 7, whereby the label can be snapped onto one of the many locations (not shown in FIG. 3) on the rail to be electrically connected to the bus. Springy contacts 51, 52, and 53 permit reliable electrical connection between the label of FIGS. 2 and 3 and the rail.

Figure 4A:
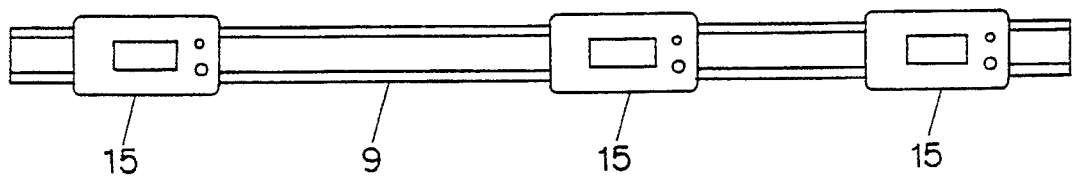
FIG. 4a is a front view of a portion of the system of FIG. 1, including a shelf rail 9 and labels 15.
Figure 4B:
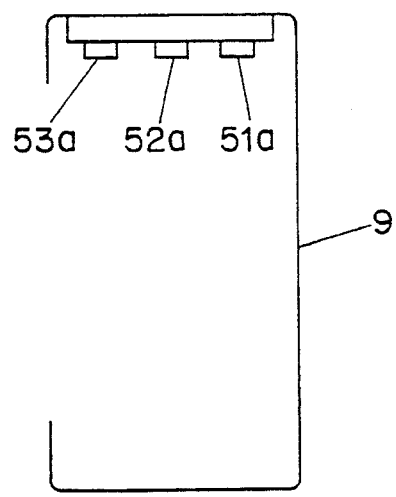

FIG. 4a illustrates a physical disposition of the labels 15 on rail 9. Thus, the labels 15 may be used to display the prices of the goods close thereto, which prices are communicated to them from computer 11, not shown in FIG. 4a. FIG. 4b shows a cross section of rail 9. Contacts 51a, 52a, and 53a run along the length of the rail 9 and are positioned so as to provide electrical connection between the rail bus and the labels 15. The cross section of FIG. 4b is consistent along the entirety of the length of rail 9, so that any particular position along the length of rail 9 is a potential location where a label 15 may be installed. If, as mentioned above, an appender 12 is associated with each four-foot section of rail 9, then all connection points along the length of the four-foot section of rail are electrically identical.

Figure 5:
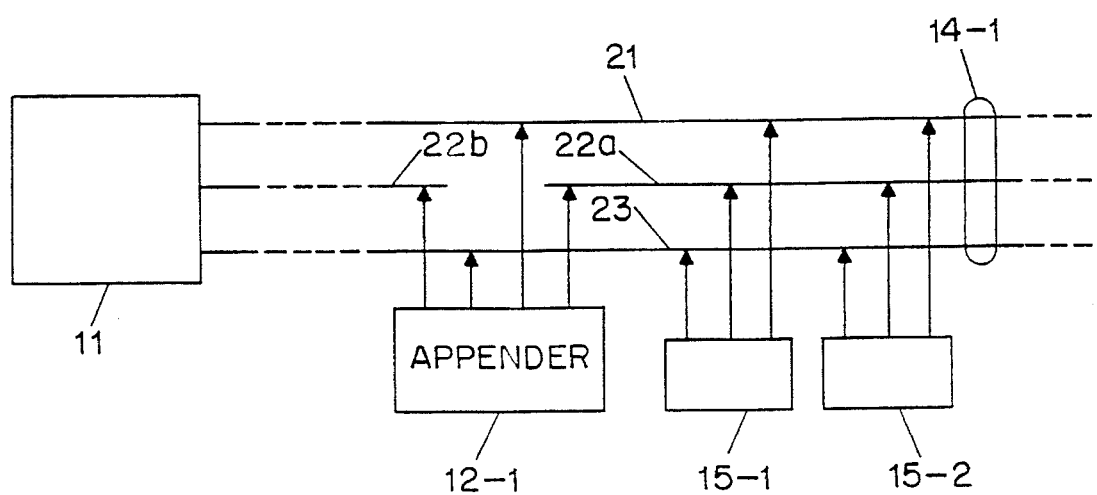
FIG. 5 shows in greater detail the interconnection between the appenders 12 and labels 15 of FIG. 1.

FIG. 5 shows detailed connections of the labels and an appender to a bus. Illustratively, bus 14-1 comprises power wire 21, data wire 22a and ground wire 23, and these three wires are carried by conductors 51a, 52a, and 53a of bus 9 (shown e.g. in FIG. 4b). Specifically, wire 21 transports power from computer 11 via bus 50 to appender 12-1, to label 15-1, to label 15-2 . . . , and to label 15-N; wire 22a transports data between computer 11 and same; and wire 23 provides a ground or common line between computer 11 and the same. As was shown in FIG. 3, each of the labels has three leads 51, 52, and 53, and these make connection to the wires 21, 22a and 23 of FIG. 5.

The appenders 12 thus have in common with the labels 15 the characteristic of receiving power and ground from computer 11 via power and ground lines. For purposes of the discussion that follows all power and ground points of attachment for appenders and labels are electrically and functionally identical. All the appenders and labels are in parallel, so far as power and ground are concerned, and if a label is attached to the bus the particular location of the attachment is of little moment.

One respect in which appenders 12 differ from labels 15, however, is in the manner of connection to the data line. Each appender, e.g. appender 12-1, is connected in series with respect to data wires 22a and 22b. That is, data between computer 11 and the labels 15-1, 15-2, etc. is communicated through appender 12-1 through its leads 24-a and 24-b. This may be seen gin FIG. 5, where the data line 22b connects from the computer 11 to lead 24b of appender 12-1, and (through an internal interconnection shown in detail below) by lead 24a to line 22a, thence to the data contacts of the labels 15-1, 15-2 etc. Line 22b also provides a data connection to the other appenders 12-2 . . . 12-M shown in FIG. 1.

Figure 6:
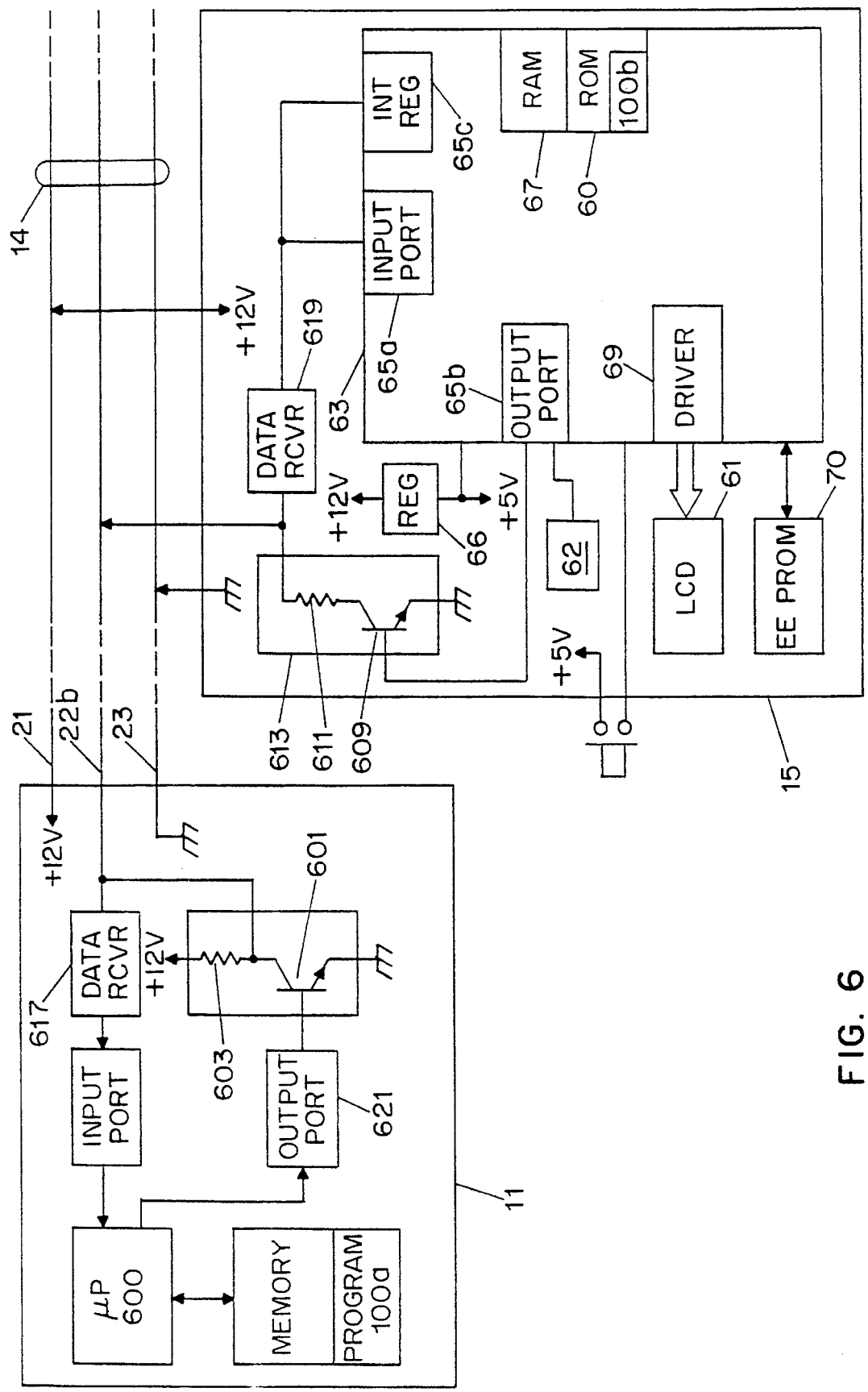
FIG. 6 shows in schematic detail the computer 11 and a label 15 and the data bus transmitters and receivers thereof.

FIG. 6 illustrates block diagrams of computer 11 and a typical label 15 which are connected to each other through bus 14. Computer 11 is a conventional microcomputer together with bus interface circuitry, comprising microprocessor 600, data receiver 617 and data transmitter 607. Microprocessor 600 which operates with transistor-transistor logic (TTL) is programmed to operate electronic pricing system 10 in accordance with a routine 100a to be described. Computer 11 communicates asynchronously with the labels, including label 15, and appenders 12 of system 10 through conventional transmitter 607 and receiver 617 pursuant to a variant of the standard RS-232 protocol.

Output 621 of the processor 600 is a TTL level signal, preferably a serial output port of the processor 600. Line 22b is quiescently at a +12 V level due to pull-up resistor 603.

Power line 21 is at +12 V as well, powered within computer 11. Ground reference 23 is likewise defined within computer 11. Transistor 601 provides a switchable ground path controlled by serial port 621. For purposes of the discussion to follow, line 22b is active-low, so that the low-voltage condition of line 22b (and thus line 22a) will be called the "asserted" state or the logic "1" state. (Those skilled in the art will appreciate that such designations are purely arbitrary and that the hardware and software could just as easily be configured so that the low-voltage condition was the unasserted and/or logic 0 state.)

The RS-232 standard calls for nominal +12 V and −12 V levels, with data transitions through zero. In the system herein disclosed, the +12 V and 0 V levels are the nominal levels, with data transitions between those extremes; it is for this reason that the present system might best be termed a variant of the RS-232 protocol.

As mentioned above, computer 11 also provides a power source of 12 volts to the rest of system 10 through wire 21. In addition, through wire 23, system 10 is commonly grounded with computer 11. The latter is a ground both for signal references and for power distribution, representing another variation on the classic RS-232 protocol.

Communication on the bus is asynchronous and serial. A start bit representing a transition from about 12 volts to about 0 volts indicates to all bus devices that a serial byte is about to be sent, and preferably the bits that follow comprise 8 data bits and a stop bit, all at 9600 baud. As will be discussed further below, the first leading edge of a start bit at the beginning of a byte or group of bytes preferably serves as an interrupt to the processor of each appender and label so that the processor may monitor the data line and collect all the bits of one or more serial bytes carried on the data line. Under program control the processor disables the interrupt and reenables it only after receipt of all the expected bytes, or after a timeout in exceptional circumstances.

Continuing in discussion of FIG. 6, central to label 15 is processor 63. In the illustrative embodiment, microprocessor LC5851N manufactured by Sanyo Electric Co., Ltd. is employed as processor 63. This processor operates with TTL levels and comprises, inter alia: data input port 65a, data output port 65b, interrupt register 65c, read only memory (ROM) 60, random access memory (RAM) 67, and liquid crystal display (LCD) driver 69. A full description of the functions and specifications of the microprocessor LC5851N may be found in a manual No. 3341, which is made available by Sanyo Electric Co., Ltd. Semiconductor Overseas Marketing Division, and which is hereby incorporated by reference.

ROM 60, programmed permanently at the time of manufacture, contains a monitor program which orchestrates the basic operation of label 15 to perform different functions required thereof. One of these functions is to communicate messages with computer 11 asynchronously. To this end, each message communicated between computer 11 and label 15 is sent to or retrieved from RAM 67 through the data input and output ports 65a and 65b. The processor 63 properly formats the output messages in the serial protocol and recognizes the input messages in that same protocol. Similar to transmitter 607 and receiver 617, transmitter 613 and receiver 619 convert the voltage levels of, respectively, the outgoing bits from and incoming bits to processor 63. When the label 15 is to transmit data, transistor 609 is controllably turned on, providing a short or near-short (defined by resistor 611) on data line 22a. It will be recalled that pull-up resistor 603 in the computer 11 defines the data line voltage level in the absence of any transistor pulling the data line to a lower level. ROM 60 is also programmed to operate label 15-1 in accordance with routine 100b to be described.

EEPROM 70, also connected with processor 63, contains the identification of label 15-1 which represents its unique address on the bus in electronic pricing system 10. EEPROM 70 preferably is a serial-in serial-out shift register memory, offering the advantage of a small pin count in its connection with processor 63. The unique identification is programmed by a several-step process—the address is accumulated in RAM 67, and then stored in EEPROM 70, in response to a specific instruction received over the bus. It is anticipated that for a given label 15, the specific instruction would be given only once, so that the unique identification remains unchanged during the life of the label. Alternatively, the unique identification could be stored in some other form—jumpers in the printed wiring board of the label, or masked contents of ROM 60 being two examples.

While EEPROM 70 is shown as a separate piece part from processor 63, one skilled in the art will appreciate that one could, without departing from the scope of the invention, employ a processor with built-in EEPROM instead. Other types of memory could be used instead of those described above. A battery-backed RAM could be used, for example, to store some or all of what is described above as stored in EEPROM. The processor's stored program could be in EEPROM, EPROM, OTPROM, or battery-backed RAM, for example, rather than the ROM described above.

The messages from computer 11 through data wire 22b and 22a to processor 63 may contain price information such as the price of goods, price per unit of goods, etc. Upon receiving such messages in RAM 67, the program therein extracts the price information, stores it in EEPROM 70, and provides it to LCD driver 69. This driver, in a standard way, provides electrode voltage levels so that the price or other information is displayed by LCD 61 which is of conventional design.

As mentioned before, power wire 21 provides power to label 15-1. The power is used, for example, to power LED 6 (not shown in FIG. 6) supported by conventional LED circuitry 62. In addition, through voltage regulator 66, the received power, which in this instance is 12 volts, is converted to 5 volts for processor 63 and TTL circuitry 64. Push-button 5 is a conventional switch for allowing a customer to change the displayed information from, for example, the price of the goods to their unit price. Push-button 5 when pushed creates an electrical signal level to the processor 63. The program within ROM 60 polls the button periodically for detecting any such pressing of the button. Upon detection of the pressing of the button 5, the program retrieves alternative price information from EEPROM 70 or from RAM 67 to be displayed by LCD 61. Such information could include unit pricing. FIG. 6 also shows the connection of ground wire 23 to label 15-1.

The condition of data line 22a is made available to processor 63 by above-mentioned data receiver circuitry 619. The output of circuitry 619 is made available at a data input line of processor 63 and also, preferably, to an interrupt port of the processor 63. The control program 100b of the label 15 may thus, as described further below, advantageously minimize latency time in the processor 63 responding to occurrence of a start bit on the data line.

In order to fully appreciate the present invention, it is important to point out the difference in the current level on wire 22a (and thus wire 22b) when transmitter 607 within computer 11, versus transmitter 613 within label 15-1, transmits. Transmitter 607 comprises transistor 601 and 12-volt pull-up resistor 603; at the label 15 may be found the emitter-grounded open-collector transistor 609. The base of transistor 601 is electrically connected to send-data port 621 to receive binary bits therefrom, and the emitter of transistor 601 is grounded. The base of transistor 609 is electrically connected to output port 65b to receive binary bits therefrom, and the emitter of transistor 609 is also grounded.

Due to these particular arrangements of transmitter 607 and transmitter 613 and the fact that both receiver 617 and receiver 619 are normally of very high impedance, one skilled in the art will appreciate that the magnitude of the current on wire 22a (and thus 22b) is virtually zero regardless of whether TTL binary bit 1 or bit 0 is transmitted by transmitter 607. On the other hand, the current level on wires 22a and 22b is significant whenever a zero-volt (grounded) value is transmitted by transmitter 613. In this system the start bit is always transmitted by transmitter 613 whenever a message from label 15-1 is transmitted. In short, the current level on wires 22a and 22b is significant for at least one bit-interval time (i.e. the start bit) when a message is transmitted from a label 15 to computer 11.

Figure 7:
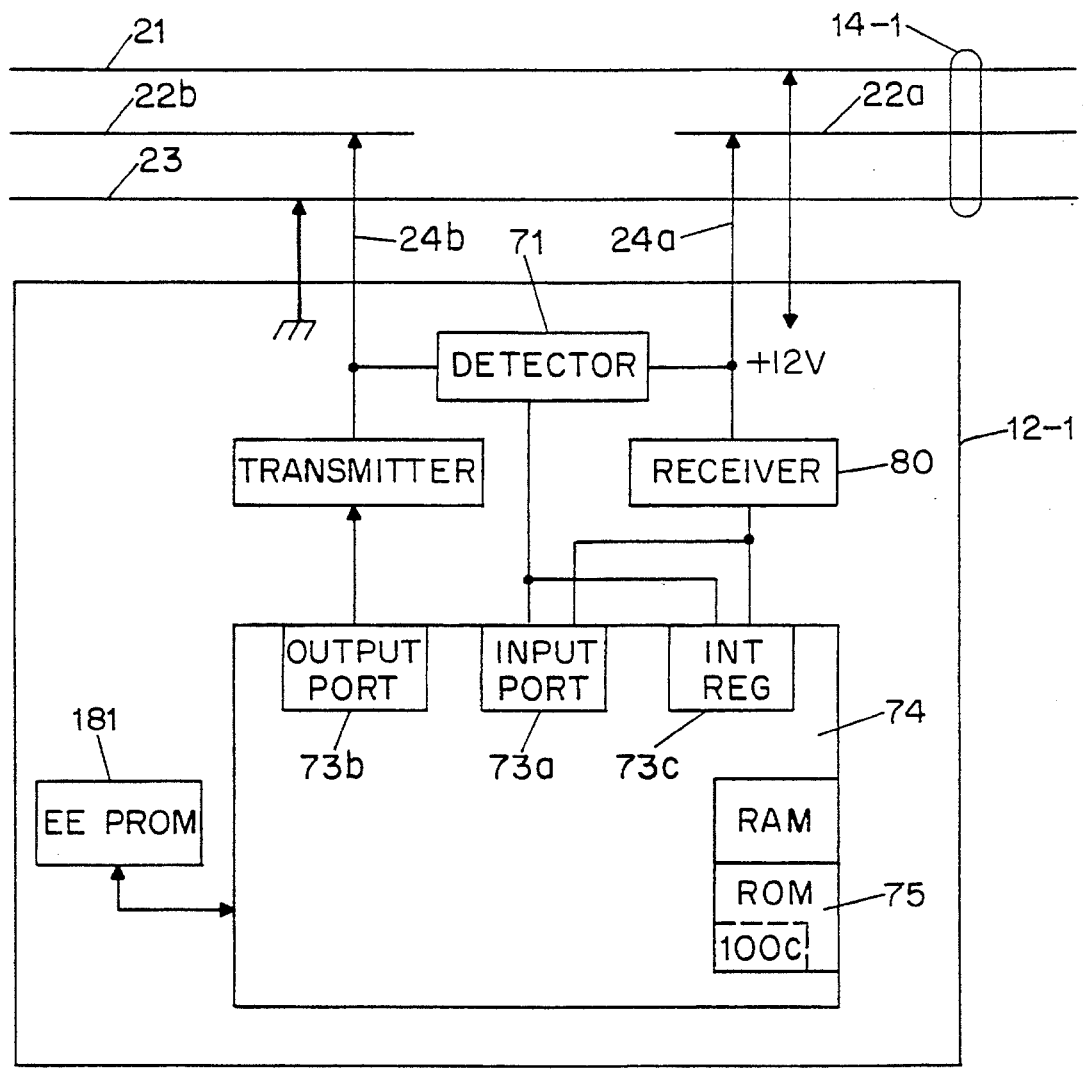
FIG. 7 shows in schematic detail an appender 12 and the data bus transmitters and receivers thereof, along with current sensor 71.

FIG. 7 illustrates a block diagram of appender 12-1 connected to bus 14-1. Appender 12-1 obtains power from wire 21 and ground from wire 23, and in this respect is similar to label 15-1 of FIG. 6. Central to appender 12-1 is processor 74 which is preferably physically identical to processor 63 of FIG. 6, differing only in its unique bus address stored in EEPROM 181 and perhaps in details of its stored program 100c. That is, in this particular illustrative embodiment, a microprocessor LC5851N is employed as processor 74. As mentioned before, such a processor includes a ROM 75, an input port 73a, an output 73b, and an interrupt register 73c. Appender 12-1 also comprises current detector 71 which senses the amount of current flowing in a predetermined direction on data wires 22a and 22b through leads 24a and 24b.

In an exemplary embodiment current detector 71 is a resistor 182 of predetermined value, connected to lead 24a at one end and to lead 24b at the other end. Voltage sensor 183 senses the voltage across the resistor 182, and voltage of a predetermined polarity in excess of a predetermined magnitude gives rise of a signal to input port 73a.

Current detector 71 provides information via input port 73a to processor 74 upon detection of a significant current flow on data wire 22a in a predetermined direction or, in other words, when a message is sent from a label to computer 11, as explained hereinbefore. Processor 74 is programmed to react, in accordance with its stored program 100c to be described below, by transmitting its identification to append to the message heading for computer 11. This identification, which represents an address particular to the appender, is programmed in EEPROM 181. The transmission by processor 74 is made possible by transmitter 79, which is similar to transmitters 607 and 613. Appender 12 also has a receiver 80, which is similar to receivers 617 and 619, so that appender 12 may receive serial bytes on the data bus. Receiver 80 provides data to processor 74 via input port 73a, and provides an interrupt to processor 74 via interrupt register 73c.

As mentioned before, in a retail store, physical placement of products may have enormous influence on the sales of the products. Factors including shelf height for a product, and the number of product facings along a shelf can be of great significance to store planners. Thus, it is important for a store planner to ensure that the "plan-o-gram" of a store is faithfully followed. However, deviations from the plan-o-gram could often result from accidental or intentional misplacement of the labels by store personnel or customers. Thus, it is desirable to remedy the misplacement or relocation of the labels as expeditiously as possible.

In this preferred embodiment, the labels 15 are designed to be snapped onto a rail 9 through their connectors 7. Any relocation of one such label 15 necessarily calls for the removal of the label 15 from the bus associated therewith. Such removal causes the label 15 to lose momentarily its power which, as mentioned above, is provided through the bus on power line 21.

In accordance with the invention, each label 15 is programmed to annunciate the event of an outage of power. Whenever power is applied to the label 15, the processor 63 of a relocated label sets an internal power flag bit indicative of this event, and in a manner described below, this event is annunciated to computer 11.

Figure 8:
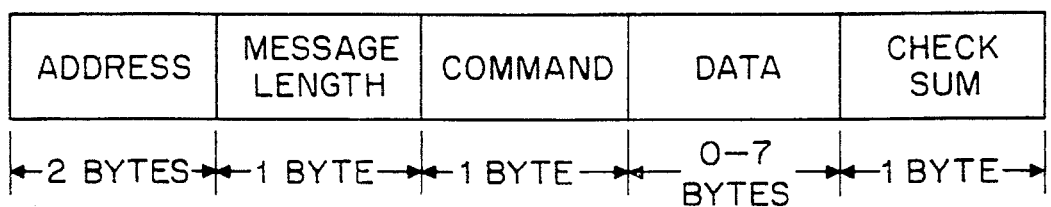
FIG. 8 shows in diagrammatic form a typical message communicated on the bus of the system of FIG. 1.

The format of messages communicated between the labels and computer 11 will now be described; FIG. 8 illustrates one such message. As shown in FIG. 8, a generalized message is headed by a label address field which consists of 2 bytes. Specifically, if this message is transmitted by a label, the label address in that field indicates which label it is from. Otherwise, if this message is transmitted by computer 11, the label address indicates which label the message is intended for. It is important to note that the address 0000H (Hexadecimal) is reserved for a purpose to be explained.

The label address field is followed by the message length field which is one byte long. This field indicates the length of the current message. The knowledge of the message length is important in that a message is normally split up and is sent byte by byte. With this knowledge, any device receiving a message is able to confirm that it has received a complete message by keeping track of the number of bytes received.

Following the label address field and the message length field is the command field which is one byte long. In messages originating at the computer 11 this field contains a command byte, and permissible command bytes as mentioned above and discussed below include commands for a label to update a price, commands for a label to confirm its correct operation, and other commands.

In messages originating at a label 15 the command field contains a status byte indicative of the status of the label 15. In accordance with the invention, a bit within the status byte is predeterminedly designated as a power flag bit. This flag bit is indicative of the above-mentioned flag, so that the bit will be set by a label in a message to computer 11 only when the label experiences an outage, followed by a regain of power.

Moreover, two individual command bytes originating at computer 11, which hereinafter are referred to as command A and command B, are relevant to the discussion of the present invention. Command A is addressed to an individual label to inquire into the status of the power flag bit, and to order the label to reset the power flag bit for subsequent messages to computer 11 if it has been set. Command B is addressed to all the labels from computer 11 by fixing the associated address field to 0000H. This command enables computer 11 to inquire into the statuses of the power flag bits of all the labels in electronic pricing system 20.

The command field is followed by the data field which is 0 to 7 bytes long. For example, the data field in a message from computer 11 to a label may contain the price information.

The last field of the message is the checksum field which is 1 byte long. This field, in a conventional manner, enables the necessary error checking of the message.

Those skilled in the art will appreciate that a number of conditions not fully in the control of the system designer may conspire to keep a valid message from being received by the recipient, and may cause a device to respond as if there were an incoming message when in fact there is none. Noise on the data bus, while desirably uncommon, will occasionally register as a start bit, for example. For these reasons, each device that may potentially receive a message (e.g. computer 11, appenders 12, and labels 15) is preferably programmed to check for receipt of a complete message, and a mismatch between the expected and actual message lengths is provided for, typically by ignoring the message. Similarly, the occurrence of a framing error due to the failure of a stop bit to arrive as expected will prompt the device to ignore the message. Finally, failure of the above-mentioned checksum to match the previously received bytes of a message will be detected and the message will be ignored. Optionally the computer 11 may keep statistical information regarding the overall frequency of occurrence of such communications errors for troubleshooting purposes, for example in an error log storage location 109 shown in FIG. 11.

Of course, the message format depicted by FIG. 8 is for illustrative purposes. Thus, it is expected that a person skilled in the art may devise a different format to suit a particular application.

The stored programs of the above-mentioned devices will now be discussed in further detail.

Label 15 is programmed with stored program 100b. Upon power-up the label performs an initialization routine including setting the power flag indicative of power having been applied. As described below, under normal circumstances, a moment soon arrives during which a message from computer 11 prompts the label 15 to clear the power flag bit.

The stored program of the label 15 is quiescent most of the time, with the usual condition being a steady-state display of a price on the LCD. During long stretches of time it is anticipated that the power flag will persist in the cleared (i.e. not set) state.

As mentioned above, arrival of a start bit on data line 22a provides a hardware interrupt to the processor 63. Responsive to this, the processor 63 under control of the stored program 100b then monitors the logic level received at receiver 619 and clocks the received bits into RAM 67, checking for a potential framing error in the event of absence of the expected stop bit. The processor continues clocking in bytes of data of the message. The byte count permits the processor 63 to know which byte is the last one; failure of the expected number of bytes to arrive is noted as an error. The last byte, which as mentioned above is a checksum, is compared with the rest of the message for consistency, and failure in the comparison is noted as an error. In a preferred embodiment any of the errors prompts the label 15 to ignore the message.

Following successful confirmation of the checksum, the address (which as mentioned above is preferably 2 bytes) is inspected, in an activity that is sometimes referred to as address decoding. Most frequently the address will fail to match the unique address of a particular label 15, but in the relatively infrequent event of an address match, then the label interprets the command byte and responds accordingly.

As mentioned above the command may be to update a price, to respond with the status of the particular label 15 (i.e. the above-mentioned command A), or to take some other predetermined action. Command A, also called an "individual read status" command, is of interest here and will be described in detail.

In response to command A (which in an exemplary embodiment is a command byte value of 82H) the label assembles a response message and transmits it on the bus via transmitter 613 for receipt by the computer via receiver 617. The response message includes the two-byte unique identifier of the particular label 15, a message length byte (here, five), the status byte, and a checksum. The status byte, as mentioned above, includes a bit indicative of the power flag status for the label. Generally, except in the event of a recent power interruption, this bit would be expected to be 0 (i.e. not set), The stored program 100b is such that when the response message is sent, the processor 63 also clears the power flag. Thus, if the computer 11 were to issue command A to a particular label twice in quick succession, it is expected that barring some intervening loss of power the second of the two respective responses would have a status byte in which the bit representative of the power flag is zero.

The above discussion relates to the label operation in the event of the address bytes from the computer 11 matching the unique address of a particular label 15. As mentioned above, the address of 0000H has been reserved as a "global" address, responded to identically by all labels 15. Thus, if the label finds that the received two-byte address fails to match its unique address, the label also checks to see whether the received two-byte address is 0000H. If it is 0000H, the label then checks to see if the command byte has the value associated with command B (in an exemplary embodiment, the value 53H). Command B, also called a "global conditional read status" command, prompts the label 15 to inspect the condition of its power flag. (It will be appreciated that all labels 15 in the system 10 will be inspecting the condition of their respective power flags at approximately this time.)

Under control of the stored program 100b, the processor 63 then takes no action if its power flag is at 0 (i.e. not set); as mentioned above most of the time any particular label will not have its power flag set so will take no action. However, from time to time it may happen that a label will find its power flag set after having received a global conditional read status command, and in this event the label will respond by transmitting a message on the data line 22a. The message consists of the unique address of the particular responding label 15, a message length (here, 5), a status byte, and a checksum. Significantly, in a preferred embodiment the responding label does not then clear its power flag. Instead, the power flag remains set until such later time as a command A is addressed to the particular label that responded, as mentioned above in connection with command A.

The stored program 100c of the appenders 12 will now be described. Each appender 12 has a unique address on the bus, and preferably in the 16-bit address space defined by the two bytes of the messages, a predetermined range of addresses is set aside for appenders and another range of addresses is allocated to labels 15. Each appender 12 is programmed to respond to command A if addressed to its respective address, by providing its status in a response much like that of a label 15, depending on its "locate" status, described below.

The stored program 100c defines another aspect of the function of a particular appender 12. A particular appender 12 is interrupted, in the same way any label 15 is interrupted, should a start bit appear on the data line 22b. The particular appender, like all other appenders and labels on the bus, disables interrupts, receives the command string, and confirms that the length and checksum are in order. If the received command string is not for the particular appender itself, then the appender monitors the current in the data line (lines 22a and 22b) by means of the current detector 71. The monitoring, which is preferably polling by the processor 74, continues for a period of time great enough to determine if a label on the bus of the particular appender (colloquially, "one of its labels") is replying. If one of its labels does not reply, then the particular appender waits for the data line to be idle before re-enabling its enternal interrupt. The other outcome is that one of its labels does reply. The appender in this case sets an internal "armed to reply" flag, and waits for the label to finish its reply, after which it sends its appended reply. The end of a label's reply is marked by the current detector going inactive for a predetermined interval. In one system according to the invention, the maximum inactive time that can occur within a valid label reply is about 950 microseconds, so the predetermined interval is set at about 1250 microseconds.

The appender's appended message is much like that of the label, and comprises two bytes containing the unique address of the appender, a message length byte (here, 5), a status byte, and a checksum.

It will be appreciated that the appending function happens only if the message originated at a label 15 rather than at the computer 11, and it will be further appreciated that this happens only if the particular label 15 happens to be on the particular bus 14 associated with the particular appender 12. Stated differently, since the pull-up resistor 603 is on the central-computer side of the appender, then no driving transistor on the central-computer side of the appender will trigger the current sensor. This rules out the driving transistor 601 of the central computer 11 and the driving transistor 609 of any labels or appenders located on the central-computer side of a particular appender 12.

Also in the set of defined commands from central computer 11 to appenders 12 are two commands "locate on" and "locate off". The "locate off" command addressed to a particular appender disables all appending functions by that appender. A subsequent "locate on" command addressed to a particular appender re-enables the appending functions by that appender. Upon application of power to an appender, the power flag status bit is set within the appender (analogously to that in a label) and additionally, the appender is initialized to the "locate on" state. When an appender has a status of "locate off", it will respond to a command A; when its status is "locate on", it does not. Each appender responds to commands "locate on" and "locate off" by providing its status, including the power flag bit information.

The appended message is principally of use to the computer 11 as assisting in confirming the expected location of a label 15, for example in connection with a global read status command, or with an individual read status command addressed to a particular label hat is known to have been moved recently. The appended message is also of use to the computer 11 as assisting in the physical locating of a label under circumstances of a label having been moved from its expected location.

Figure 9:
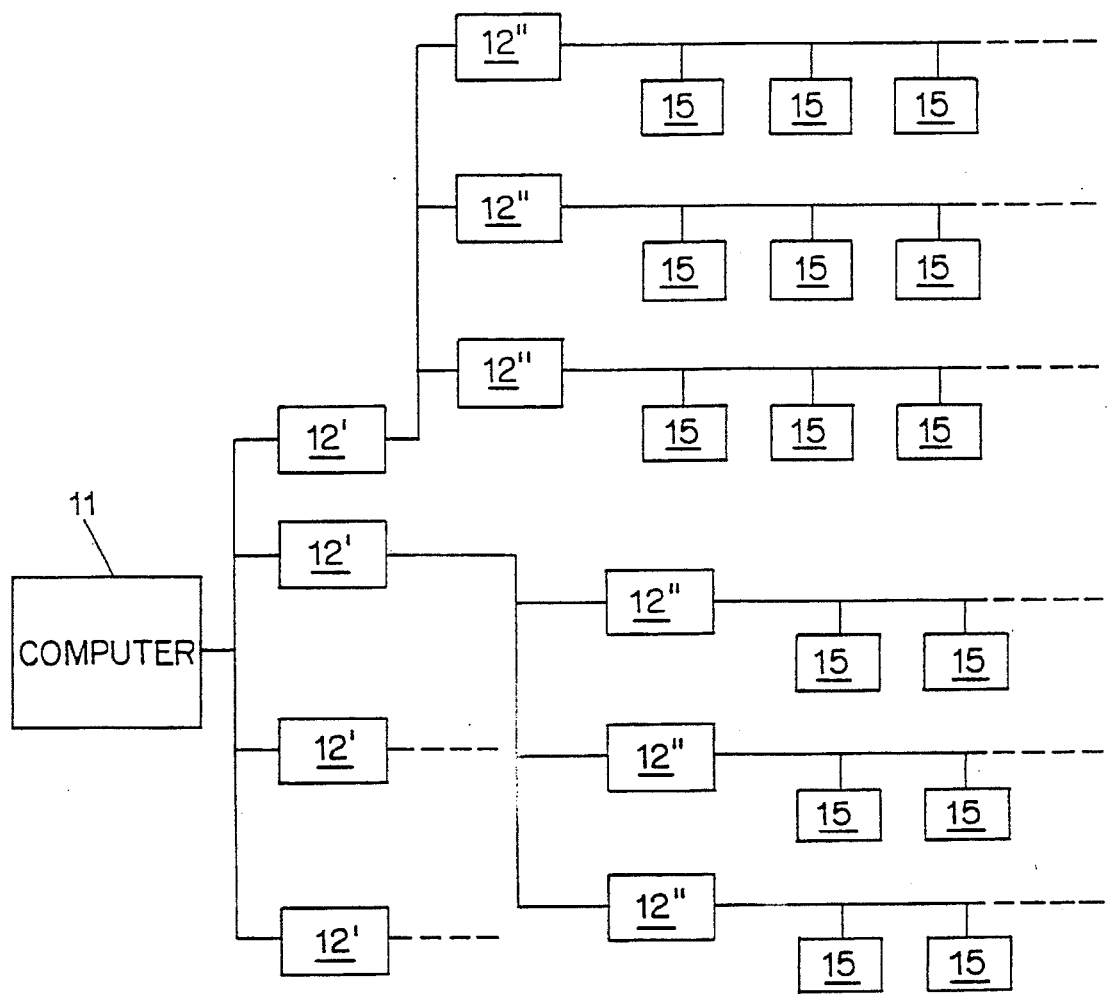
FIG. 9 is a drawing of the system architecture of another embodiment of the invention, including computer 11, appenders 12' and 12", and labels 15.
Figure 10:
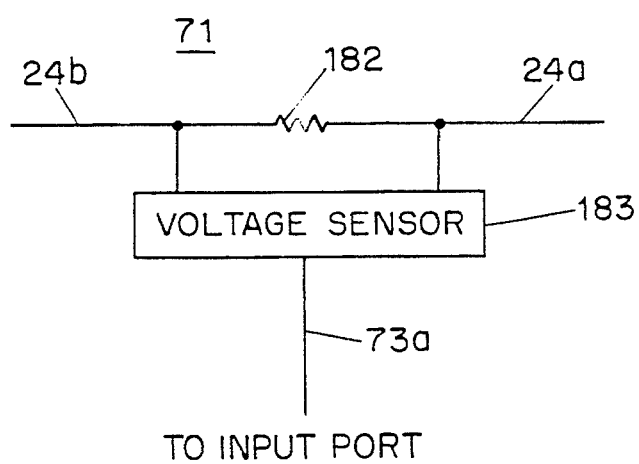
FIG. 10 shows in partial schematic form the current detector 71 of appender 12.

One skilled in the art will appreciate that the architecture of FIG. 1, with a computer 11 and a number of appenders 12, permits the computer 11 to gather much useful information as to the location of labels 15. FIG. 9 shows an architecture offering additional information regarding locations. A tree structure connects the computer 11 with a number of appenders 12'. Each appender 12' is connected with a number of appenders 12". Each appender 12" is connected with a number of labels 15. A response by a particular label 15 is received by the computer 11, following which a particular appender 12" associated with the particular label 15 appends a message indicative of its unique address. After that, a particular appender 12' associated with the particular appender 12" appends a message indicative of its unique address. As a result, the computer 11 receives three messages for each message generated by a label. While the preceding description has assumed a single level of appenders interposed between computer 11 and labels 15, the scope of the invention should not be so limited but should comprehend, for example, additional layers of appenders interposed between computer 11 and labels 15.

In an alternative embodiment the appenders 12', also called gondola controllers, are disposed one for each gondola, which is a set of shelves defining one side of an aisle and one side of an adjacent aisle. The gondola controllers are linked to the central computer 11 by spread-spectrum RF links, and provide backup power for the appenders 12" and labels 15 within the gondola. As a result, the labels 15 in a gondola are able to continue to display prices on their LCDs 61 despite loss of power to the gondola controllers. In this arrangement, the power on lines 21 comes not from the central computer 11 but from the gondola controllers.

Figure 11:
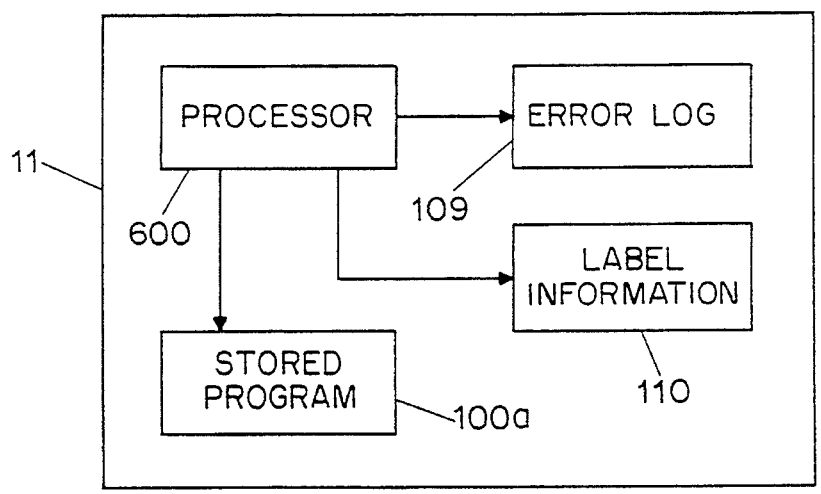
FIG. 11 shows in block form a portion of the internal arrangement of the computer 11 of FIG. 1.

The stored program 100a of the central computer will now be described; the stored program 100a is shown diagrammatically in FIG. 11. Most of the stored program 100a of the central computer is devoted to keeping track of the prices of individual items of merchandise and, for each, the price that is to be displayed at the shelf. It is desired that this be the same price, for example, that is charged at the checkout counter when the item is purchased. Other portions of the stored program keep track of the expected levels of inventory for the items of merchandise, so that as described below under certain circumstances the amount in inventory may be displayed at the shelf. Still other portions of the stored program keep record of the intended and indeed expected physical location of each label 15. This information relates to the above-mentioned plan-o-gram for a store. For a given label, record is kept of the unique label identifier, the uniform product code (UPC) for the associated product, a textual description of the product, and the unique identifier of the appender (or appenders, in a two-level appender system such as that shown in FIG. 9) which pertain to the expected location of the label 15. Optionally, record may also be kept of the subarea of the store in which the label is expected to be physically located. Subareas may be larger or smaller than the the areas covered by particular appenders, and represent areas in which alternative displaying may take place, as described further below in connection with alternative displaying. The records relating to the labels are shown diagrammatically as memory 110 in FIG. 11.

From time to time it will happen that it is desired to change some of the prices for items of merchandise. In the usual arrangement this updating is batched to occur at a time when the store is closed, such as late at night. A block of data is sent by the store's central management (typically at a site remote from the store) to the store, preferably by modem communication over a direct-dialed telephone line. The block of data is unpacked by the computer 11 and information indicative of desired price changes is stored in memory and communicated to the associated labels 15. The price changes at the shelf and the price charged at the checkout counter is changed to match it.

From time to time it will also happen that it desired to change the physical location of some of the items of merchandise. This may be because of introduction of a new item, elimination of a discontinued item, or change in the desired number of product facings for an item, for example. In the usual arrangement this updating is batched much as is the price change information. Communicated to the store is information, typically visual in nature, defining the new plan-o-gram, telling store personnel to move labels 15 as needed, and directing the installation of new adhesive fronts to labels indicative of the products associated therewith. Corresponding data is unpacked by the computer 11 and is stored in memory. Labels are then snapped into place by store personnel according to the desired plan-o-gram, and each new label responds to a global read status inquiry when it is powered up. The central computer 11 then builds up a table of data, label by label and shelf by shelf, until all the changes have been made. This table may be compared with information from the store's central management, and exceptions thereto are logged and reported.

The stored information takes into account the appender addresses (and optional subarea information) for each moved, deleted, or moved label.

The computer functions discussed above take place typically once a day or less frequently. What follows is a description of functions of the computer 11, under control of the stored program 100a, that occur more or less continuously.

The stored program 100a causes the computer 11 to conduct "bed checks" of the labels 15. Each label 15 is addressed individually, one after another, and in each instance the computer awaits a response. The command A is well suited to this purpose, and the label's response provides reassurance that the label is connected to the bus 14 and is functioning properly. The absence of the expected response permits the computer 11 to detect a variety of faults, including physical absence of a label 15, failure of the electrical contacts 51, 52, or 53 of a label 15, and failure of the electrical contacts 51a, 52a, or 53a of a rail 9. Preferably the failure of a label to respond to an individually addressed command is logged to a list of "suspect labels". It should be appreciated that a bed check of a particular label is accomplished wherever the label may be, and is not dependent on the label being in the expected physical location.

Another type of bed check that may be performed is requesting that a particular label respond with the contents of its price display, permitting the computer 11 to confirm that the expected price (stored in computer 11) matches the displayed price (provided by the label in its response).

The sequence of addresses followed in the bed check may be numerical by unique address, may be in sequence according to expected physical location, or intentionally staggered to spread out the bed checks over the entire store to the greatest extent possible. For example, one label on each of the rails 9 may be bed-checked, and after all the rails 9 have had a bed check the computer 11 goes on to bed-check a second label on each rail 9, and so on, so as to minimize the time before failure of a given rail 9 is detected.

It will be appreciated that the above-described bed checks will detect some inadvertent or intentional relocations of labels. For example, if a label is moved to a physical location served by a different appender, then when that label is bed-checked, the appended message will differ from the expected appended message. Locating the errant label is easier than having to search the entire store; the computer 11 under control of its stored program 100a will direct store personnel to the physical rail or rails served by the appender that appended its message.

It will also be appreciated, however, that the above-described bed-checks, without more, will not detect movement of a label if the movement happens to remain within the physical region served by a given appender. For example, movement of a label a few inches to the right or left along a shelf rail will not give rise to detection due to the above-described bed checks, as the appended message will remain unchanged.

The utility of the power flag associated with the conditional read status command will now be apparent. Superimposed on the background task of performing bed checks is an additional background task, namely making global read status inquiries on the bus. Under control of the stored program 100a, the computer 11 preferably interleaves global read status inquiries with individual label bed checks. In general it is expected that there would be no response to the global read status inquiry, since in general no label will have lost and regained power in the interval since the last global read status inquiry. Desirably global read status inquiries are transmitted much more often than one per minute. Bus bandwidth considerations limit the frequency of global read status inquiries but desirably they may occur as often as once per second.

From time to time a label may respond to a global read status inquiry. If it does, the response as mentioned above includes the unique address of the label, which is logged for later correction by store personnel. The response, as mentioned above, also has appended to it an appender's unique address, which is of utility in that the computer 11 may give precise instructions to store personnel to shorten the time required to locate the errant label.

The frequent issuance of global read status inquiries will reduce to a low level the likelihood of two labels responding to an inquiry, sometimes called a collision. Nonetheless the stored program 100a desirably provides for this possibility. When two labels respond, they both pull down the data line 22a, 22b with their respective transmitters 613. It is not unlikely the two labels will respond more or less simultaneously, in which case the label message received at the computer 11 is, depending on the logic sense of the bus, either the logical AND or the logical OR of the two messages. This will give a meaningless label address to the computer 11, and may cause a checksum failure. Those skilled in the art will appreciate that in this particular circumstance checksum failure should not cause the computer 11 to ignore receipt of a label message; instead, steps must be taken to identify the labels giving rise to the garbled response. Bed checking of all labels by use of the individual read status command provides a reliable way of finding the reporting labels; desirably almost the entire bus bandwidth is devoted to this task since the global read status command will be useless until the two or more labels have been identified, error-logged, and cleared. Preferably the bed checking starts with the above-mentioned "suspect labels", since they may have been posted to the suspect list due to a disconnection from the bus and thus may explain a collision due to nearly simultaneous reconnection to the bus.

occasionally it may occur that the two labels that are attempting to respond simultaneously are served by the same appender. In this case, the appender message will not be garbled but will instead be perfectly intelligible to the computer 11, and this shortens greatly the bed-checking task. The computer 11 can bed-check all labels known to be served by the responding appender (based on information in store 110) and either or both of the labels having power flags giving rise to the simultaneous response will be identified, error-logged, cleared.

In other instances the two labels that are attempting to respond simultaneously are not served by the same appender. In this case, the appender message will be garbled as well. If the system 10 has two levels of appenders as shown in FIG. 9, then one more opportunity is presented to narrow down the location of the two (or more) responding labels, namely if the two labels are served by the same higher-level appender 12'. This circumstance happens when the label messages are garbled, the first appender's messages are garbled, but the second appended message (from the higher-level appender 12' that serves both errant labels) is clearly received. The computer 11 can bed-check all labels known to be served by the responding higher-level appender 12' (based on information in store 110) and either or both of the labels having power flags giving rise to the simultaneous response will be identified, error-logged, cleared.

Although the stored program 100a desirably has the capability of tracking down two or more errant labels 15 that attempt simultaneously to respond to a global read status inquiry, it should be emphasized that due to the high frequency of global read status inquiries, in general it is expected that simultaneous label responses, giving rise to collisions, would be rare.

As was mentioned above in connection with FIG. 9, one embodiment of the invention shifts to gondola controllers 12' the responsibility for providing power on lines 21 to the labels 15. Those skilled in the art will appreciate that as a matter of design preference the bed-checking and global power-flag checking duties may be shifted to the gondola controllers 12'. This offers the advantage that a given gondola controller 12' is in a position to employ the entire bandwidth of its data bus to the less demanding task of monitoring the condition of a number of labels 15 that is far smaller than the total number of labels in the system 10. This shortens greatly the period of time that is required to bed-check all labels in the event such system-wide bed-checking becomes necessary. Preferably the gondola controllers 12', even if programmed to initiate certain bus commands such as bed-checks or read status checks without their having been issued by the central computer 11, will will nonetheless pass all messages back and forth between the computer 11 on the one hand and the appenders 12" and labels 15 on the other.

As mentioned earlier in connection with FIG. 9, the gondola controllers are optionally connected with the central computer 11 by spread-spectrum RF transceivers. Messages between two transceivers are sent in bursts. An unintelligible burst may arise because of stray RF energy in the vicinity of the system, or because of simultaneous RF transmission by two of the transceivers, called an RF collision.

When a global read-status command is issued by the central computer in an RF-linked system such as that of FIG. 9, the usual and expected result is a timeout, i.e. the lack of a response by any label 15. From the foregoing, however, it will be appreciated that a timeout could arise from either of two causes, namely the actual lack of a response by any labels, or an RF collision. In the latter case, valuable information about label responses would be lost unless provision is made to preserve it. For this reason it is desirable that each gondola controller 12' have a functionality above and beyond that of a mere appender 12", namely preserving information about the occurrence of a response to a global read-status inquiry. Thus, the controller keeps track of each occurrence of a global conditional read status inquiry, and monitors the data line for a period of time sufficient to detect a label response. If there is a label response, this event is noted, and an associated flag is set. At such later time as the central computer requests that the controller report its status, the controller will report among other things the fact of the flag having been set indicating a response to a global conditional read status inquiry. Optionally the controller could report the entirety of the label message and the appender message.

Just as it is desired to perform global conditional read status inquiries as part of the background task fairly frequently, likewise it is desired to perform controller status checks fairly frequently. The former improves the prospects of detecting a newly powered-up label soon after the power-up. The latter improves the prospects of detecting a newly powered-up label even in the event of the label's response getting lost due to an RF collision.

An additional aspect of stored program 100a relating to label locations will now be described. As mentioned above, those familiar with store operations will appreciate that from time to time it is desirable that store personnel be able to know things other than price regarding store items. That is, it would be desirable if store personnel could controllably cause a label, or a group of labels in a subarea of the store, to show some alternative datum regarding each item of merchandise. For example, though product scanning at the checkout counter permits most store items to be reordered automatically, it is nonetheless helpful for personnel to be able to walk the aisles of the store to identify visually any items that require reordering or restocking from the back room of the store. Shoplifting and other forms of inventory shrinkage, for example, can give rise to a disparity between the expected stock (defined as the difference between the amount of product shipped to the store and the amount of product sold at the checkout counter) and actual stock physically present in the store. It would be desirable to have a means whereby the labels would display in numerical terms the number of cases of the product that are in the back room. Where the shelf is bare and the back-room quantity count is small or zero, personnel can initiate an exceptional reordering of product. Where the displayed back-room quantity count is at odds with the actual quantity count in the back room, other corrective action may be taken.

Figure 12:
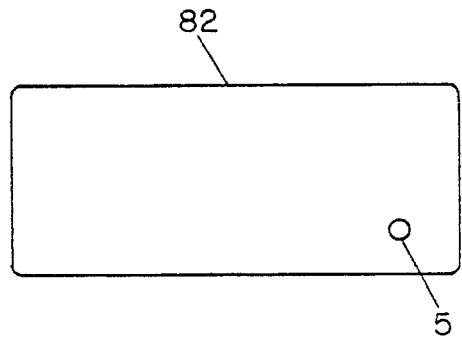
FIG. 12 is a front view of a dongle 82.
Figure 13:
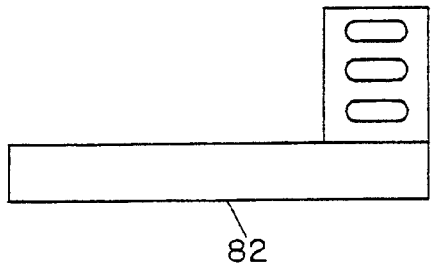
FIG. 13 is a top view of the dongle 82 of FIG. 12.

In keeping with the invention, the stored program 100a makes provision for such alternative displays, initiated by requests by store personnel in subareas of the store. In a first embodiment, store personnel may initiate an alternative display by snapping into place on a rail a "dongle", which is mechanically identical to a label but has its unique address associated, in the stored program 100a, with the dongle functionality. A typical dongle 82 is shown in FIG. 12, with push-button 5 corresponding to a push- button in a label 15. Optionally the display 61 and LED 6 usually found in a label 15 may be omitted in the dongle 82.

When the dongle is snapped into place on a rail 9, the next subsequent global read status command triggers the dongle to send a message to the computer 11. The appended message or messages tell the computer 11 where the dongle is. With reference to the stored label information 110, the computer 11 identifies the subarea where the dongle is located. As mentioned above, this may be identical to the area served by the identifier, or may desirably include other labels in the same physical vicinity. For example, appenders may be associated with each four-foot section of shelf rail, and all the labels in a vertical floor-to-ceiling group of four-foot sections may be defined as comprising a subarea.

Figure 14:
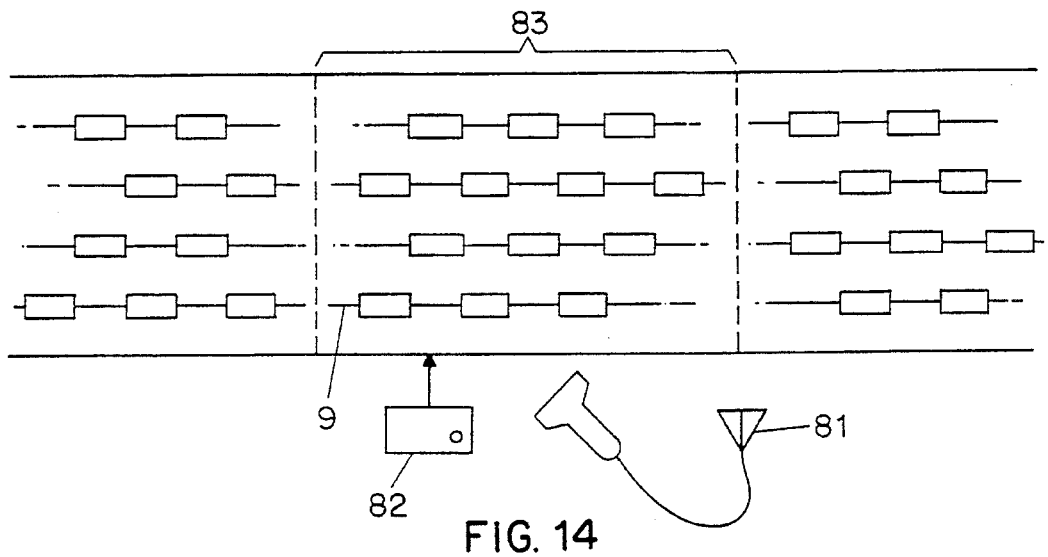
FIG. 14 is a plan view of a subarea 83 of a store employing the system of FIG. 1.

FIG. 14 shows a typical subarea 83 of this type, and dongle 82 is shown prior to its being snapped onto a rail 9 of the subarea 83. As mentioned above, the layout of subareas selected for a given store configuration is within the discretion of the store management.

Under control of the stored program 100a, the computer 11 responds to receipt of the dongle message with one or more of messages to the labels in the associated subarea. Desirably, the computer 11 sends one message to each such label, commanding each label to display respective alternative information such as the back-room quantity count, or the expected inventory. Later it is expected that store personnel will detach the dongle from the rail, an event noted by the processor due to frequent bed-checking of the dongle during the time of the alternative message display. Alternatively the dongle may be programmed to send to computer 11 a message indicative of its push-button 5 having been pressed by store personnel, which may optionally start, or stop, or change, the alternative display. One of the most advantageous aspects of the present invention is now apparent, namely that while some subarea of the store has been placed in an alterative display mode, the remainder of the store may continue to show price information of the sort that is usually seen by customers. The other aisles of the store, and indeed the remainder of the aisle in which a subarea has been changed, continue to provide the information expected by customers, thus minimizing the potential disruption of store personnel activities associated with the use of the alternative display capability.

Push-buttons 5 of the labels 15 in the area of alternative display may also be used to communicate information to the central computer. For example, the information shown in the alternative display may be the proposed quantity of merchandise to be shipped to the store in a reorder. Button presses could be used to indicate a desired change, either for a larger or a smaller quantity of the merchandise.

Upon removal of the dongle, or upon pressing of the push-button 5 of the dongle by store personnel if so defined in the system 10, the computer 11 under control of its stored program 100a will cause the labels in the subarea to return to normal displays, by sending messages directed to that end.

Figure 15:
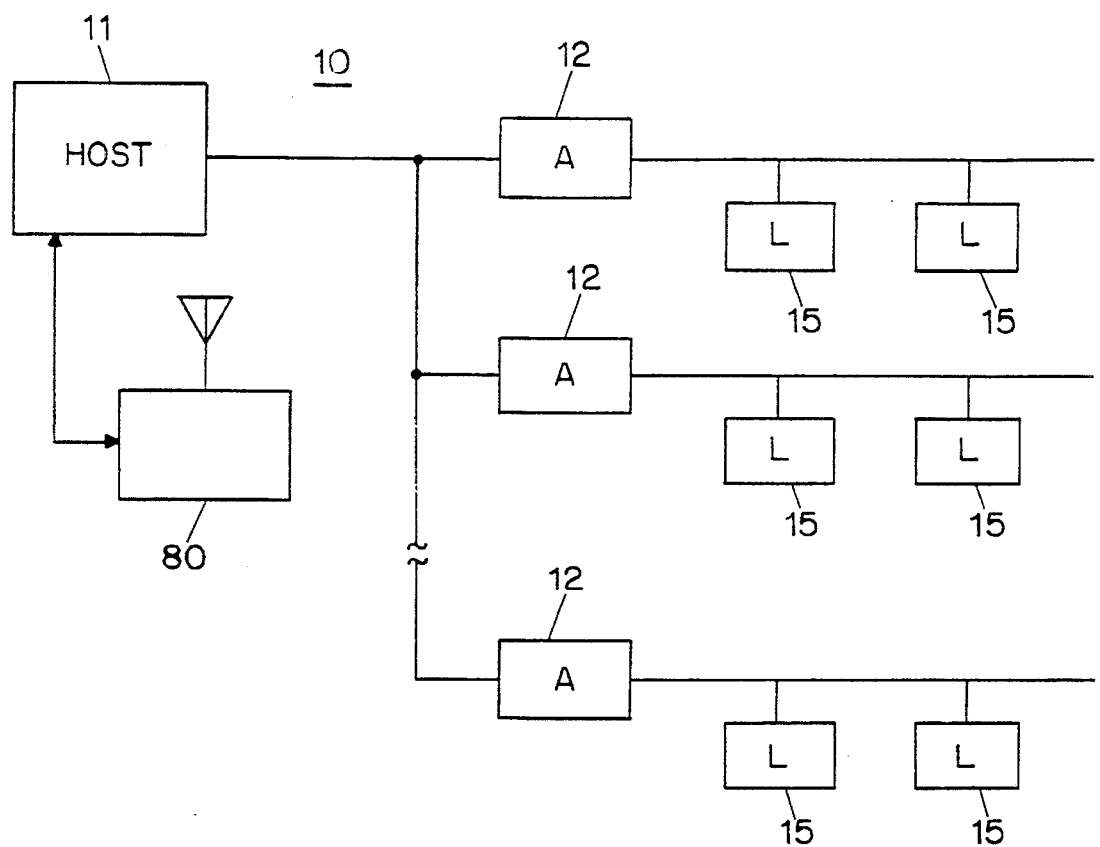
FIG. 15 is a drawing of the system architecture of an embodiment of the invention, including RF transceiver 80.

Another means of initiation of alternative displays by store personnel is by RF link and a bar-code scanner. An RF-linked system 10 is shown in FIG. 15, with central computer or host 11, appenders 12, and labels 15 as described above. Also operatively connected with central computer 11 is an RF receiver or transceiver 80. Store personnel may carry portable bar code scanner and RF transmitter or transceiver 81 to arbitrary locations in the store, as shown in FIG. 14. Personnel may then "swipe" or "shoot" a bar code or other optically readable code of a product by applying the scanner 81 to a product (or to a scannable code on a label 15 associated with a product if the labels are so equipped). The scanned data is then transmitted via radio frequency (RF) means to the receiver or transceiver 80, and thence to the central computer 11. The central computer 11 consults label information 110 (shown in FIG. 11) and determines the subarea associated with the product. The stored program 100a then causes the central computer 11 to send one or more messages to the labels 15 in the subarea, so that alternative messages will be displayed in the subarea. The alternative display may be changed in response to the same or another product being scanned, in response to a push-button 5 being pressed on a label 15, or after a simple timeout.

The foregoing merely illustrates the principles of the invention and those skilled in the art will be able to devise numerous arrangments which, although not explicitly shown or described herein, embody the principles of the invention. For example, the invention is disclosed herein in a form in which the various communications functions are performed by discrete functional blocks. However, any one or more of these functions could equally well be performed by one or more appropriately programmed microprocessors, microcoded integrated circuits, application-specific integrated circuits, and so on.

We claim:

1. A system for display of information regarding items which are arranged in an area, the system comprising:

a central computer;

a bus connected to the central computer;

a multiplicity of display devices connected to the central computer, each display device having a unique address on the bus and being physically connectible to the bus in a multiplicity of locations, each display device capable of displaying data in response to a message from the central computer;

means within the central computer for maintaining records of the physical connection locations of the display devices, the records defining subareas within the area;

request detection means responsive to receipt of a display change request, for identifying the particular subarea corresponding to the request and transmitting on the bus at least one message relating to the display devices connected at locations in the particular subarea, whereby substantially all display devices in the particular subarea change from displaying any previously displayed data to displaying changed data in response to the request, and whereby substantially all display devices not in the particular subarea continue displaying previously displayed data.

2. The system of claim 1 wherein the bus comprises a main bus and bus extensions, and each bus extension comprises a rail having electrical contacts along its length, said contacts electrically connected to the central computer.

3. The system of claim 2 wherein the system further comprises a plurality of appenders located on the main bus, each appender having a unique address on the bus, each appender being associated with a geographic portion of the area and permitting bidirectional communications between the main bus and a particular bus extension associated with that appender.

4. The system of claim 3 wherein the system is further characterized in that a plurality of the display devices are connected with each bus extension; and each display device comprising a housing, a processor, and a connector, said connector being connectible to the rail at any of the multiplicity of locations along its length and having contacts corresponding to the contacts of the rail and being electrically engageable therewith, the processor operatively connected with the connector for receiving messages on the bus.

5. The system of claim 4 wherein the request detection means comprising a dongle, said dongle comprising a housing, a processor, and a connector, said connector connectible to the rail at any of a multiplicity of locations along its length and having contacts corresponding to the contacts of the rail and electrically engageable therewith, the processor operatively connected with the connector for receiving messages on the bus.

6. The system of claim 5 wherein the maintaining means further comprises means for maintaining records of the physical connection locations of the appenders.

7. The system of claim 6 wherein the display change request is realized by connecting the dongle to a rail at a particular location and transmitting a message by the processor of the dongle to the central computer via the bus.

8. The system of claim 7 wherein each appender is responsive to an occurrence of sending of a message by the dongle on the bus extension associated therewith, for sending an append message subsequent to the conclusion of the message sent by the dongle, the append message containing information indicative of the unique address of the appender; and wherein the request detection means further comprises:
means for receiving the message sent by the dongle,
means for receiving the append message containing information indicative of the unique address of the appender, and
means for determining, based on the records of the physical connection locations of the display devices and the appenders, the subarea within which the dongle was connected to a rail.

9. The system of claim 1 wherein the central computer further comprises a radio frequency receiver connected operatively thereto; and the maintaining means further comprises means for maintaining records of scannable data items associated with respective display devices.

10. The system of claim 9 wherein the request detection means comprises a portable device which comprises a scanner and a radio frequency transmitter operatively connected thereto.

11. The system of claim 10 wherein the display change request comprises a message containing information indicative of a scannable item of data associated with a display device.

12. The system of claim 11 wherein the request detection means further comprises means for determining, based on the records of the physical connection locations of the display devices and of the scannable data corresponding thereto, the subarea within which the display device corresponding thereto is located.

13. A method for use in a computer in a displaying system where said computer is operatively connected to a bus, and a plurality of display devices are electrically connectible to said bus in a plurality of locations thereon; said method comprising the steps of:

defining geographic areas by grouping ones of said locations;

receiving a request for changing displays of the display devices connected at the locations in a particular geographic area, the request containing information indicative of a subarea from which said request was originated;

identifying said geographic area from said information, said subarea being within said particular geographic area; and transmitting, in response to the request, on said bus at least one message to the display devices located in said particular geographic area so that substantially all of those display devices change to displaying data different from what was previously displayed.

14. A method for use in a system for displaying information, said system comprising: a dongle, a bus comprising a main bus and bus extensions; a computer operatively connected to said main bus; a plurality of display devices electrically connectible to said bus extensions in a plurality of locations therein; and a plurality of appenders each connected with one of said bus extensions and with said computer through said main bus; said method comprising the steps of:

defining geographic areas by grouping ones of said locations;

electrically connecting said dongle to a particular bus extension in one of said locations in a particular geographic area;

transmitting a request from said dongle on said particular bus extension for changing displays of the display devices connected in locations in said particular geographic area;

transmitting a message from a particular appender connected to said particular bus extension after transmission of said request, said message containing an address identifying said particular appender apparatus on said bus;

receiving by said computer said request and said message;

identifying by said computer said particular geographic area from said address in said message; and transmitting by said computer, in response to said request, on said bus at least one message relating to the display devices located in said particular geographic area so that substantially all of those display devices change to displaying data different from what was previously displayed.

15. A method for use in a system for displaying information, said system comprising: a scanner having a radio frequency transmitter, a bus; a computer operatively connected to said bus and to a radio frequency receiver; and a plurality of display devices electrically connectible to said bus in a plurality of locations therein; said method comprising the steps of:

defining geographic areas by grouping ones of said locations;

scanning by said scanner first information indicative of a geographic area;

transmitting a request from said scanner via the radio frequency transmitter, for changing displays of the display devices connected in locations in said particular geographic area, the request containing the first information;

receiving by said computer said request and said first information;

identifying by said computer said particular geographic area from said first information in said request; and transmitting by said computer, in response to the request, on said bus at least one message relating to the display devices located in said particular geographic area so that substantially all of those display devices change to displaying data different from what was previously displayed.

* * * * *